(12) United States Patent
Aoki

(10) Patent No.: US 9,132,758 B2
(45) Date of Patent: Sep. 15, 2015

(54) HEATER AND HEATING SYSTEM

(75) Inventor: Hiroshi Aoki, Tokyo (JP)

(73) Assignee: Takata Corporation, Tokyo (JP)

( * ) Notice: Subject to any disclaimer, the term of this patent is extended or adjusted under 35 U.S.C. 154(b) by 173 days.

(21) Appl. No.: 13/814,473

(22) PCT Filed: Jul. 27, 2011

(86) PCT No.: PCT/JP2011/067168
§ 371 (c)(1),
(2), (4) Date: Feb. 5, 2013

(87) PCT Pub. No.: WO2012/017901
PCT Pub. Date: Feb. 9, 2012

(65) Prior Publication Data
US 2013/0127212 A1    May 23, 2013

(30) Foreign Application Priority Data
Aug. 5, 2010 (JP) .................................. 2010-176822

(51) Int. Cl.
*A47C 7/72* (2006.01)
*B60N 2/56* (2006.01)
*B60N 2/00* (2006.01)

(52) U.S. Cl.
CPC .............. *B60N 2/5685* (2013.01); *B60N 2/002* (2013.01)

(58) Field of Classification Search
CPC .... B60N 2/5685; B60N 2/5635; B60N 2/002; H05B 2203/029
USPC ...................................... 297/180.12; 219/217
See application file for complete search history.

(56) References Cited

U.S. PATENT DOCUMENTS

| 7,134,715 B1* | 11/2006 | Fristedt et al. ............ 297/180.12 |
| 7,928,341 B2* | 4/2011 | Ito et al. ........................ 219/217 |
| 2007/0290532 A1* | 12/2007 | Frank ......................... 297/180.12 |
| 2010/0295563 A1* | 11/2010 | Bieck et al. ..................... 324/679 |
| 2011/0121618 A1* | 5/2011 | Fischer et al. ............ 297/180.12 |

FOREIGN PATENT DOCUMENTS

| DE | 10311132 A1 | 9/2004 |
| JP | 10-199661 A | 7/1998 |
| JP | 2000-080703 A | 3/2000 |
| JP | 2003-231411 A | 8/2003 |
| JP | 2004-504082 A | 2/2004 |
| JP | 2005-172839 A | 6/2005 |
| JP | 2008-024087 A | 2/2008 |
| JP | 2008-191110 A | 8/2008 |

(Continued)

OTHER PUBLICATIONS

International Search Report from the International Bureau of WIPO for International Application No. PCT/JP2011/067168 dated Oct. 25, 2011 and English translation of the same (4 pages).

*Primary Examiner* — Milton Nelson, Jr.
(74) *Attorney, Agent, or Firm* — Fitch Even Tabin & Flannery LLP

(57) ABSTRACT

Heater electrodes and a sensor electrode both in a film shape are formed on the top surface of an insulation sheet without overlapping with each other. As a result, a seat heater has a small overall thickness. Then, the seat heater can be placed near the seating surface of a seat without making the seat less comfortable to sit in. The occupant is detected based on the impedance between the sensor electrode and the vehicle. As a result, it is possible to warm the occupant seated on the seat efficiently and detect the occupant with accuracy.

14 Claims, 12 Drawing Sheets

(56) References Cited

FOREIGN PATENT DOCUMENTS

| | | |
|---|---|---|
| JP | 2010-070086 A | 4/2010 |
| JP | 2010-073530 A | 4/2010 |
| WO | 02/06083 A1 | 1/2002 |
| WO | WO 2008039268 A1 * | 4/2008 |
| WO | 2009/095340 A1 | 8/2009 |

* cited by examiner

HEATER AND HEATING SYSTEM

CROSS-REFERENCE TO RELATED APPLICATIONS

This application is a U.S. national phase application filed under 35 U.S.C. §371 of International Application PCT/JP2011/067168, filed on Jul. 27, 2011, designating the United States, which claims priority from Japanese Application 2010-176822, filed Aug. 5, 2010, which are hereby incorporated herein by reference in their entirety.

FIELD OF THE INVENTION

The present invention relates to a heater and heating system, and more particularly, to a heater and heating system for warming an occupant.

BACKGROUND OF THE INVENTION

Occupant restraining systems represented by seat belts and air-bag systems have become smaller and of lower cost, and are nowadays installed in almost all kinds of vehicles as standard equipment. This kind of occupant restraining system should be able to detect the occupant of a seat with accuracy for urging him/her to wear the seat belt or for controlling the air-bag according to the presence/absence of the occupant.

On the other hand, vehicles used in cold climates sometimes have a heating element installed in the seats for warming the occupants. The seats of vehicles generally have a seating surface made of a low heat conductive material such as urethane foam. Therefore, for warming the occupant efficiently, the heating element should be placed near the seating surface.

Then, a two-tier structure unit formed by laminating a heating element film and a sensor film has been proposed (for example, see Japanese National Patent Publication No. 2004-504082). Using this unit, a sensor for detecting the occupant and a heating element for warming the occupant can be placed near the seating surface. Consequently, it is possible to warm the occupant seated on the seat efficiently and detect the occupant with accuracy.

SUMMARY OF THE INVENTION

However, with the above unit, both the heating element and the sensor in a two-tier structure are placed near the seating surface. Therefore, use of the above unit may inconveniently cause the seat to be uncomfortable to sit in.

A possible solution to eliminate this inconvenience is to provide a sensor electrode for detecting the presence/absence of an occupant and a wire of heating element on a common film in the manner that they do not overlap with each other. However, a relatively large current flows through the heating element. Therefore, some noise may intrude into the electric circuit sensing the occupant when a current starts or stops flowing through the heating element.

In consideration of the foregoing, it is an objective of the present invention to warm the occupant and detect the occupant with accuracy while providing a more comfortable seat to sit in.

In order to achieve the above objective, a heater according to a first aspect of the present invention is:

a heater for warming an occupant seated on a seat of a vehicle, the heating system comprising:
a heating element disposed in the seat;
heater electrodes connected to the heating element; and
a sensor electrode disposed in the seat,
wherein the heater electrodes are supplied with electric power to the heating element,
the impedance between the sensor electrode and vehicle varies depending on the presence of the occupant in the seat, and
the heater electrodes and sensor electrode are placed in the same plane.

The heater electrodes and sensor electrode may be in a film shape.

A heating system according to a second aspect of the present invention is:

a heating system for warming an occupant seated on a seat of a vehicle, the heating system comprising:
the heater according to the first aspect of the present invention;
supply means connected to the heater electrodes and supplying electric power to the heating element;
measurement means for measuring the impedance between the sensor electrode and vehicle; and
detection means for detecting the occupant seated on the seat based on the impedance measured by the measurement means.

The measurement means may measure the capacitance between the sensor electrode and vehicle as an impedance correlation value from an AC voltage applied between the sensor electrode and vehicle and the current or voltage input to the sensor electrode in response to change in the impedance.

The measurement means may measure the quadrature component of the current at the AC voltage as the capacitance as an impedance correlation value.

The measurement means may measure the in-phase component of the current at the AC voltage, and
the detection means detects the occupant seated on the seat from the result of comparison between a threshold defined based on a relationship between the in-phase component and quadrature component and the capacitance.

The heating system may comprise a temperature detection sensor detecting the temperature of the seat near the heating element, and
the detection means detects the occupant from the temperature of the seat detected by the temperature detection sensor and the result of comparison between the threshold and capacitance.

The heating system may comprise switching means periodically connecting the supply means and heater electrodes, and
the measurement means may measure the impedance when the supply means and heater electrodes are disconnected.

The switching means may connect the heater electrodes to the supply means and to the power source applying a voltage to the heater electrodes alternately.

The power source may apply a voltage equal in phase to the voltage applied to the sensor electrode.

The power source may apply a voltage different in phase from the voltage applied to the sensor electrode.

The heating system may comprise switching means periodically connecting the supply means and heater electrodes, and
the measurement means may detect the occupant from the result of comparison of the impedance between when the supply means and heater electrodes are connected and when the supply means and heater electrodes are disconnected.

The heater electrodes may be connected to the supply means and to the power source applying a voltage to the heater electrodes alternately, and the impedance may be measured when a voltage equal in phase to the voltage applied to the sensor electrode is applied to the heater electrodes.

The heater electrodes may be connected to the supply means and to the power source applying a voltage to the heater electrodes alternately, and the impedance may be measured when a voltage different in phase from the voltage applied to the sensor electrode is applied to the heater electrodes.

According to the present invention, the heating element for warming the occupant and the sensor electrode for detecting the occupant are placed in the same plane. Then, it is possible to warm the occupant and detect the occupant with accuracy without making the seat less comfortable to sit in.

DETAILED DESCRIPTION OF THE PREFERRED EMBODIMENTS

<Embodiment 1>

Figure 1:
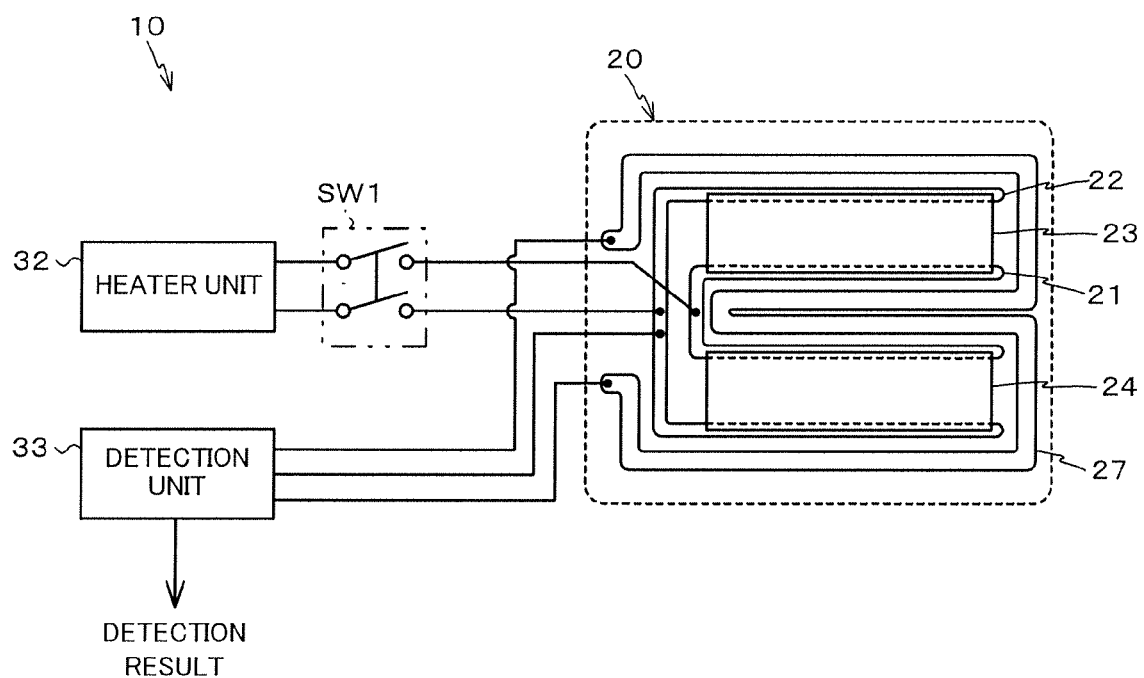
FIG. 1 is a block diagram of the heating system according to Embodiment 1.

Embodiment 1 of the present invention will be described hereafter with reference to the drawings. FIG. 1 is a block diagram of a heating system 10 according to this embodiment. The heating system 10 is, for example, a system for warming the occupant seated on a seat of a vehicle. The heating system 10 has, as shown in FIG. 1, a seat heater 20, a heater unit 32, a detection unit 33, and a changeover switch SW1.

Figure 2:
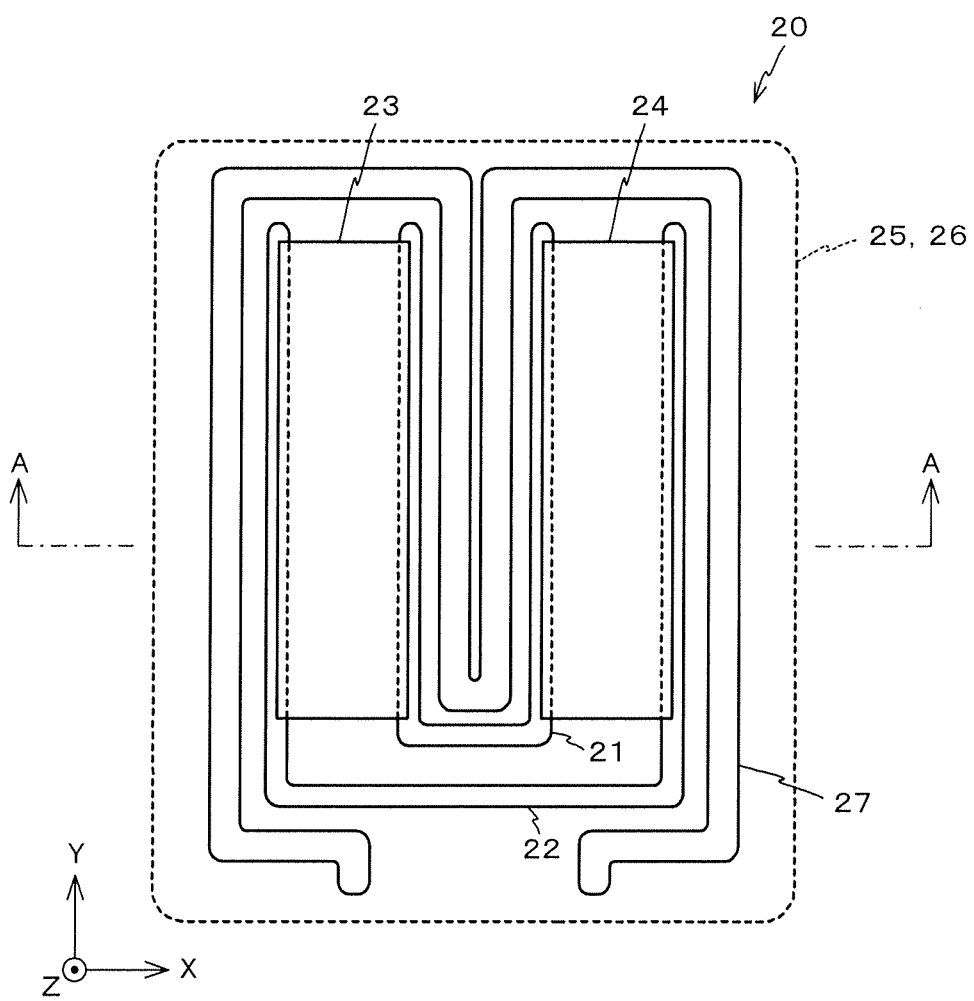
FIG. 2 is a plane view showing the seat heater.
Figure 3:
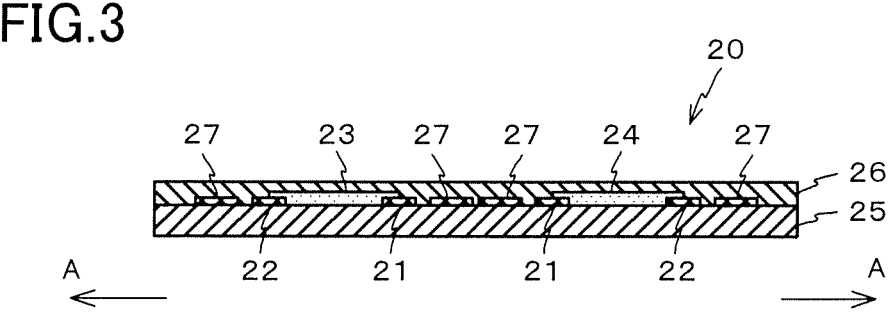
FIG. 3 is a cross-sectional view at a line A-A of the seat heater in FIG. 2.
Figure 3:
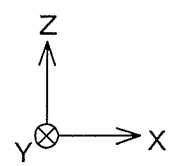

FIG. 2 is a plane view showing the seat heater 20. FIG. 3 is a cross-sectional view at the line A-A of the seat heater 20 in FIG. 2. As shown in FIGS. 2 and 3, the seat heater 20 has a sensor electrode 27, two heater electrodes 21 and 22, heating elements 23 and 24 extending between the heater electrodes 21 and 22, and insulation sheets 25 and 26 covering these parts.

The insulation sheet 25 is, for example, a PET (polyethylene terephthalate) sheet, a Mylar film, or the like. The insulation sheet 25 can be a sheet made of a flexible material such as polyimide, polyvinyl chloride, and silicon rubber. The insulation sheet 25 has a rectangular shape of which the length extends in the Y-axis direction. The above-mentioned sensor electrode 27, heater electrodes 21 and 22, and heating elements 23 and 24 are formed on the top surface (the surface on the +Z side) of the insulation sheet 25.

The heater electrodes 21 and 22 are made of silver paste or copper and patterned into a U-letter shape. As shown in FIG. 2, the heater electrode 21 is placed at the center of the insulation sheet 25 and the heater electrode 22 is placed outside the heater electrode 21.

The sensor electrode 27 is provided along the edges of the insulation sheet 25 and encloses the heater electrodes 21 and 22. The sensor electrode 27 is also made of silver paste or copper like the heater electrodes 21 and 22. In this embodiment, the sensor electrode 27 is so patterned, for example as shown in FIG. 2, as to extend at the center of the insulation sheet 25 in part.

The above-described heater electrodes 21 and 22 and sensor electrode 27 can be formed, for example, by bonding copper foil to the top surface of the insulation sheet 25 and etching the copper foil for patterning.

Each having a rectangular shape of which the length extends in the Y-axis direction, the heating elements 23 and 24 are placed side by side in the X-axis direction. As shown in FIG. 3, the heating elements 23 and 24 each extend from the top surface of the heater electrode 21 to the top surface of the heater electrode 22.

The heating elements 23 and 24 can be formed on the top surface of the insulation sheet 25 by applying and curing thermosensitive resistance paste or carbon paste on the top surface of the insulation sheet 25 on which the heater electrodes 21 and 22 are formed from the heater electrode 21 to the heater electrode 22.

The insulation sheet 26 is a sheet made of a flexible material such as polyimide like the insulation sheet 25. The insulation sheet 26 is formed into the same shape as the insulation sheet 25 and bonded to the top surface of the insulation sheet 25 with an adhesive or the like. As a result, the heater electrodes 21 and 22, sensor electrode 27, and heating elements 23 and 24 formed on the top surface of the insulation sheet 25 are covered.

Figure 4:
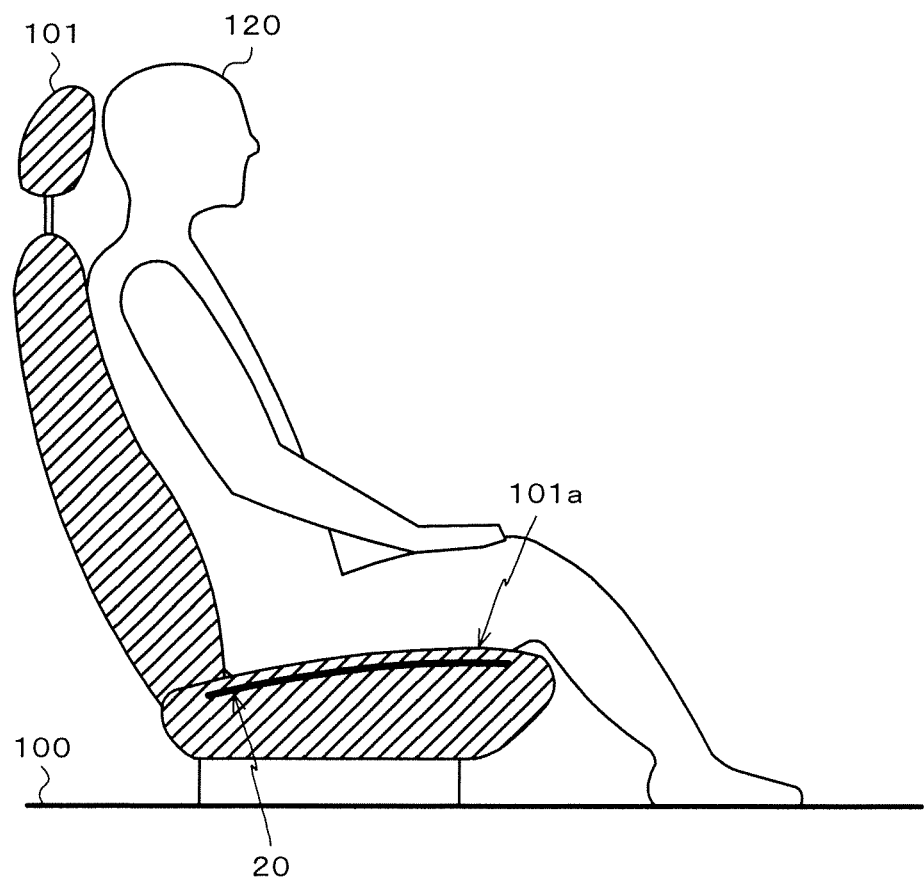
FIG. 4 is an illustration showing a vehicle seat and the occupant seated on the seat.

FIG. 4 is an illustration showing a seat 101 of a vehicle 100 and an occupant 120 seated on the seat 101. As shown in FIG. 4, the seat heater 20 having the above-described structure is placed directly under the seat cover constituting the seating surface 101a of the seat 101.

Returning to FIG. 1, the heater unit 32 is connected to the heater electrodes 21 and 22 via the changeover switch SW1. The heater unit 32 supplies electric energy from a not-shown battery mounted on the vehicle 100 to the heating elements 23 and 24 via the heater electrodes 21 and 22. Consequently, current flows through the heating elements 23 and 24 and the heating elements 23 and 24 generate heat.

The changeover switch SW1 intermittently disconnects the heater electrodes 21 and 22 from the heater unit 32. When the heater electrodes 21 and 22 are disconnected from the heater unit 32, the heater electrodes 21 and 22 and heating elements 23 and 24 are insulated from the vehicle 100.

The detection unit 33 monitors the potential of the heater electrode 22 and obtains an AC (alternating-current) impedance between the sensor electrode 27 and vehicle 100 when the changeover switch SW1 disconnects the heater electrodes 21 and 22 from the heater unit 32. The detection unit 33 determines whether the occupant 120 is seated on the seat 101 based on the obtained AC impedance. Then, the detection unit 33 outputs the determination result to, for example, an external device.

Figure 5:
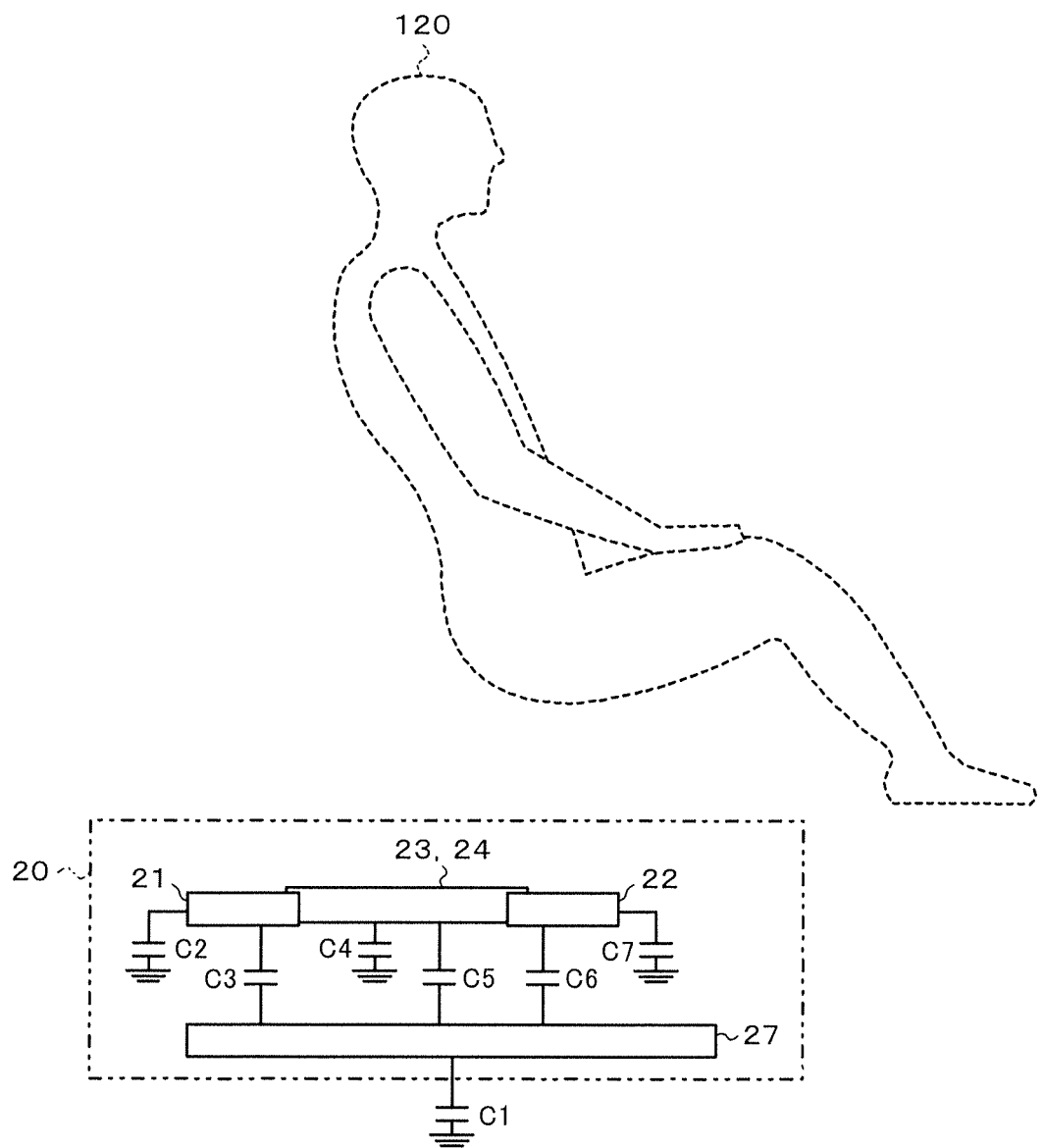
FIG. 5 is a diagram schematically showing the electric circuit formed when there is no occupant seated on the seat.

FIG. 5 is a diagram schematically showing the electric circuit formed when the occupant 120 is not seated on the seat 101. In the electric circuit formed when there is no occupant seated on the seat 101, as shown in FIG. 5, the sensor electrode 27 is connected to the vehicle 100 (ground) via a capacitor C1. The heater electrode 21 is connected to the vehicle 100 via a capacitor C2 and to the sensor electrode 27 via a capacitor C3. On the other hand, the heater electrode 22 is connected to the vehicle 100 via a capacitor C7 and to the sensor electrode 27 via a capacitor C6. The heating elements 23 and 24 are connected to the vehicle 100 via a capacitor C4 and to the sensor electrode 27 via a capacitor C5.

Figure 6:
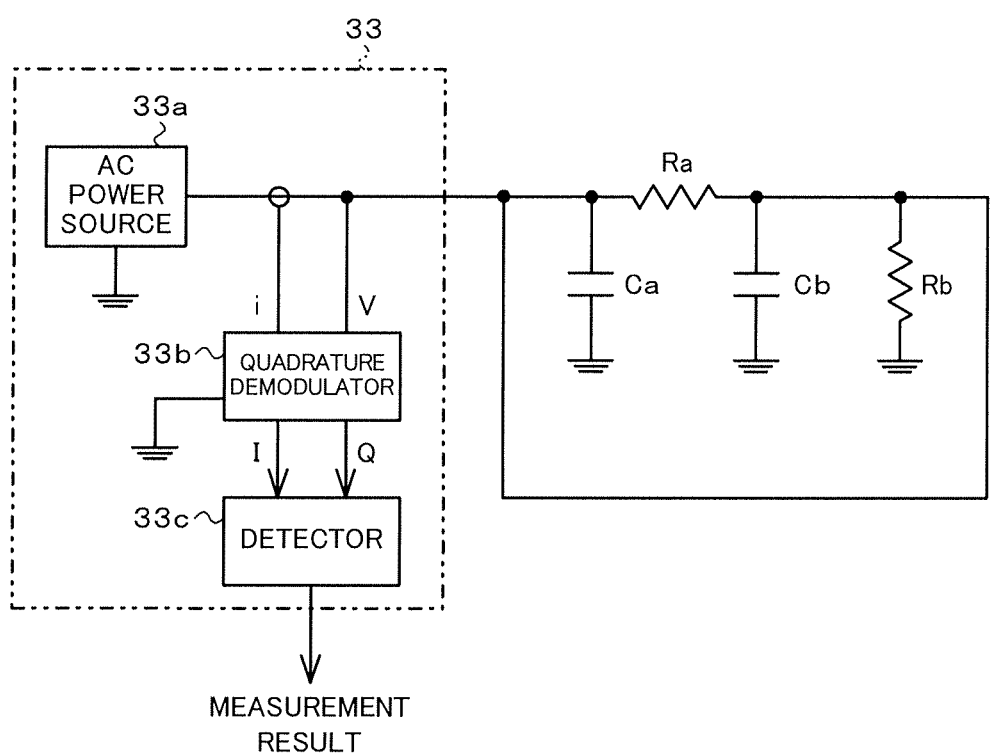
FIG. 6 is a diagram showing an equivalent circuit to the electric circuit in FIG. 5.

FIG. 6 is an equivalent circuit to the circuit shown in FIG. 5. The circuit shown in FIG. 5 can be replaced with the equivalent circuit shown in FIG. 6. A resistor Ra constituting the equivalent circuit of FIG. 6 presents the resistance of the sensor electrode 27. A resistor Rb presents the resistance between the sensor electrode 27 and vehicle 100. The resistor Rb is determined by the material of the seat and significantly larger than the resistor Ra. Furthermore, capacitors Ca and Cb are collectives of the capacitors C1 to C7.

As seen from the equivalent circuit of FIG. 6, the total capacitance $C_{T1}$ between the sensor electrode 27 and vehicle 100 is presented by the formula (1) below in which Ca and Cb are the capacitance of the capacitors Ca and Cb:

$$C_{T1} = Ca + Cb \quad (1)$$

Figure 7:
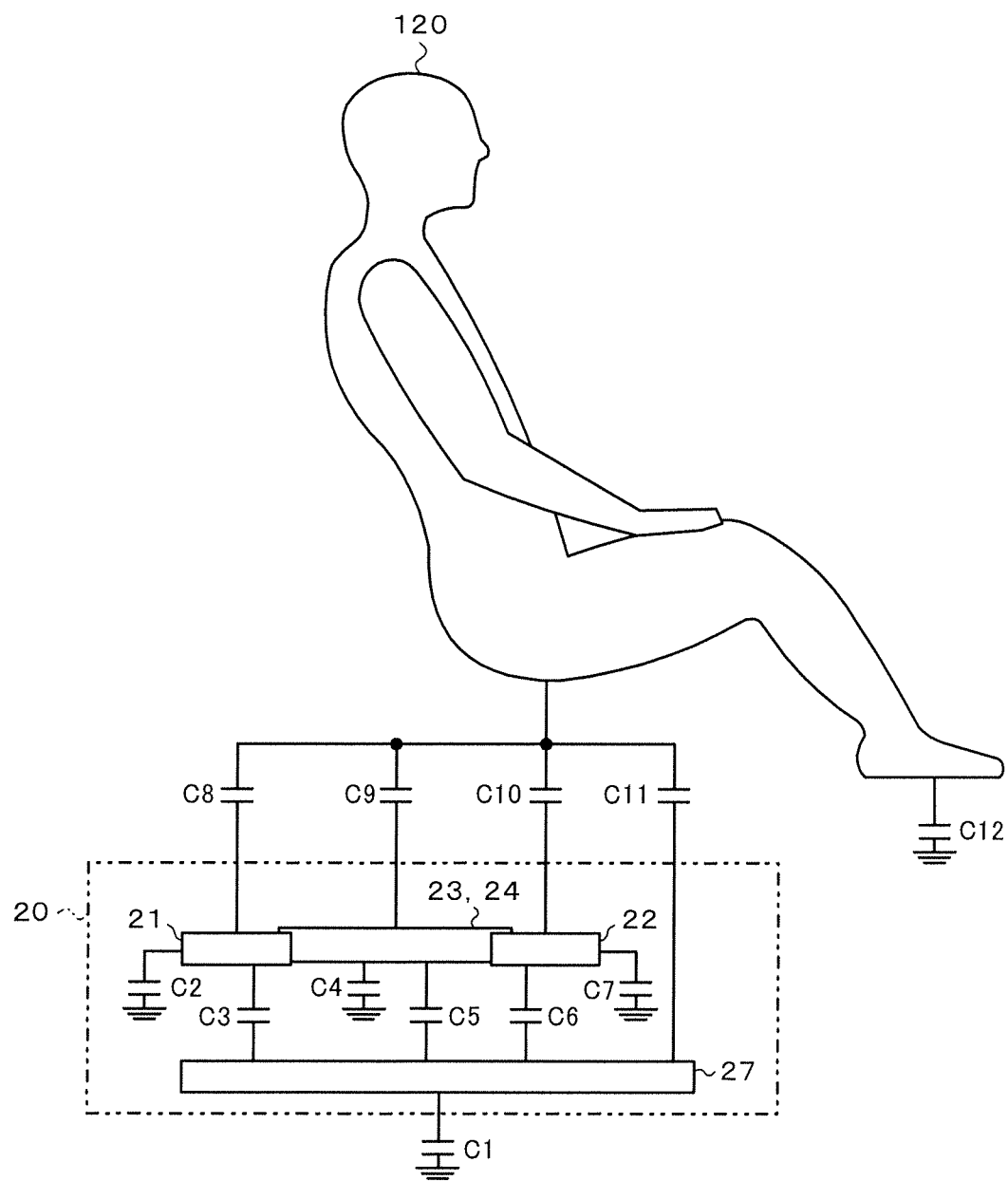
FIG. 7 is a diagram schematically showing the electric circuit formed when there is an occupant seated on the seat.

FIG. 7 is a diagram schematically showing the electric circuit formed when the occupant 120 is seated on the seat 101. As seen from comparison between FIGS. 7 and 5, a new circuit involving the occupant 120 is formed as the occupant sits in the seat 101. The newly formed circuit includes capacitors C8 and C10 presenting the capacitance between the heater electrodes 21 and 22 and occupant 120, a capacitor C9 presenting the capacitance between the heating elements 23 and 24 and occupant 120, a capacitor C11 presenting the capacitance between the sensor electrode 27 and occupant 120, and a capacitor C12 presenting the capacitance between the occupant 120 and vehicle 100.

Figure 8:
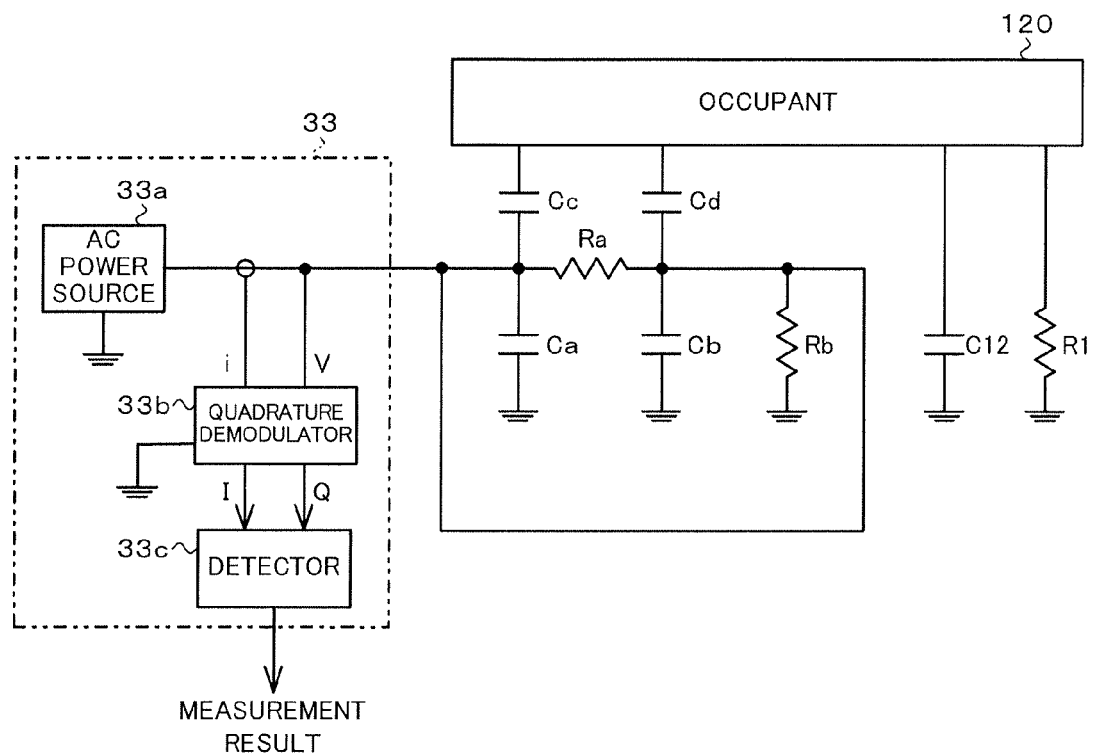
FIG. 8 is a diagram showing an equivalent circuit to the electric circuit in FIG. 7.

FIG. 8 is an equivalent circuit to the circuit shown in FIG. 7. The circuit shown in FIG. 7 can be replaced with the equivalent circuit shown in FIG. 8. Capacitors Cc and Cd constituting the equivalent circuit of FIG. 8 are collectives of the capacitors C8 to C11. A resistor R1 presents the resistance between the occupant 120 and vehicle 100.

As seen from the equivalent circuit of FIG. 8, the total capacitance $C_{T2}$ between the sensor electrode 27 and vehicle 100 when the occupant 120 is seated on the seat 101 is presented by the formula (2) below:

$$C_{T2} = C_{T1} + (Cc + Cd) \cdot C12 / (Cc + Cd + C12) \quad (2)$$

As seen from the formula (2), as the occupant 120 sits in the seat 101, the value of the total capacitance between the sensor electrode 27 and vehicle 100 is increased by the capacitance of the capacitors Cc, Cd, and C12. The detection unit 33 detects the total capacitance changing as described above and determines whether the occupant 120 is seated on the seat 101 based on the detection result. A specific structure of the detection unit 33 will be described hereafter.

As shown in FIG. 8, the detection unit 33 has an AC power source 33a, an quadrature demodulator 33b, and a detector 33c.

The AC power source 33a converts the voltage of a not-shown battery mounted on the vehicle 100 to an AC voltage of approximately 100 kHz, and applies the AC voltage between the sensor electrode 27 and the body of the vehicle 100.

The quadrature demodulator 33b monitors an AC voltage V between the sensor electrode 27 and vehicle 100 and a current i supplied to the sensor electrode 27. Then, the quadrature demodulator 33b outputs to the detector 33c information regarding the in-phase component I of the current i at the AC voltage V and the quadrature component Q of the current i at the AC voltage V.

The detector 33c determines whether the occupant 120 is seated on the seat 101 based on the values of the in-phase component I and quadrature component Q. Then, the detector 33c outputs the determination result to, for example, an external device.

Figure 9:
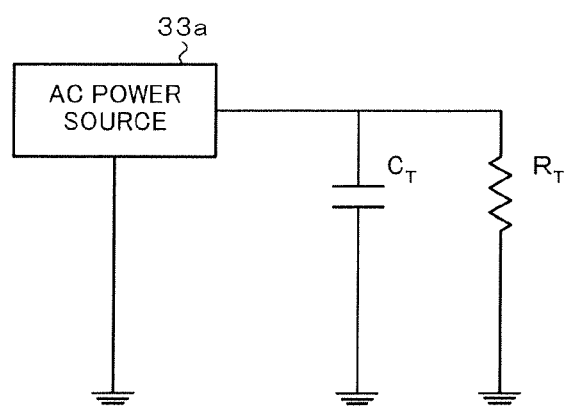
FIG. 9 is a diagram showing an equivalent circuit to the electric circuit in FIG. 8.

The electric circuits shown in FIGS. 6 and 8 can be regarded as a circuit shown in FIG. 9. In this case, the total resistance $R_T$ and total capacitance $C_T$ between the sensor electrode 27 and vehicle 100 are presented by the formulae (3) and (4) below, respectively. The formula (3) indicates that the total capacitance $C_T$ is equivalent to the quadrature component Q of the current i.

$$C_T = Q \quad (3)$$

$$R_T = 1/I \quad (4)$$

Then, for example, the detector 33c compares the value of the quadrature component Q with a given threshold. If the quadrature component Q is equal to or greater than the given threshold, the detector 33c determines that the occupant 120 is seated on the seat 101. On the other hand, if the quadrature component Q is smaller than the given threshold, the detector 33c determines that the occupant 120 is not seated on the seat 101.

Furthermore, in this embodiment, the above threshold is determined in consideration of increase in the capacitance between the sensor electrode 27 and vehicle 100 when the seating surface 101a of the seat 101 is wet or when the material of the seat 101 is moist. The threshold is determined using a line presenting the IQ property shown in FIG. 10.

Figure 10:
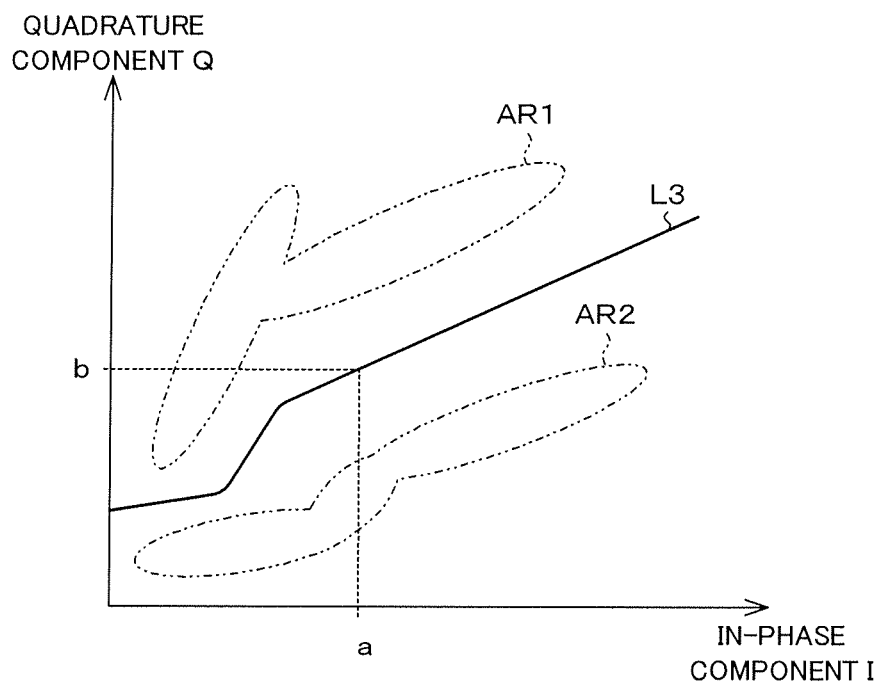
FIG. 10 is a graphical representation showing a relationship between the quadrature component and the in-phase component.

An area AR1 in FIG. 10 is an area where the points defined by the quadrature component Q and in-phase component I are present when the occupant 120 is seated on the seat 101. On the other hand, an area AR2 is an area where the points defined by the quadrature component Q and in-phase component I are present when the occupant 120 is not seated on the seat 101. The detector 33c determines the threshold based on a curve L3 separating the areas AR1 and AR2. For example, the detector 33c determines that the threshold is b when the in-phase component I has a value a.

Then, the detector 33c determines that the occupant 120 is seated on the seat 101 when the quadrature component Q has a value greater than the threshold b. On the other hand, the detector 33c determines that the occupant 120 is not seated on the seat 101 when the quadrature component Q has a value smaller than the threshold b. Then, the detector 33c outputs information regarding the above determination result to, for example, an external device.

The external device can use the determination result, for example, for giving a warning to wear the seatbelt or for controlling the expansion of the air-bag.

As described above, the seat heater 20 according to this embodiment has the heater electrodes 21 and 22 in a film shape and the sensor electrode 27 in a film shape. The heater electrodes 21 and 22 and sensor electrode 27 are provided on the top surface of the insulation sheet 25 without overlapping with each other. Therefore, the seat heater 20 has a small overall thickness. Then, the seat heater 20 can be placed near the seating surface 101a without making the seat 101 less comfortable to sit in, whereby it is possible to warm the occupant 120 seated on the seat 101 efficiently and detect the occupant 120 with accuracy.

Furthermore, in this embodiment, as seen from FIG. 1, the changeover switch SW1 disconnects the heater electrodes 21 and 22 from the heater unit 32, whereby the heater electrodes 21 and 22 are insulated from the vehicle 100. Then, in this state, the occupant 120 is detected. As the heater electrodes 21 and 22 are insulated from the vehicle 100, the capacitance between the heater electrodes 21 and 21 and sensor electrode 27 and the capacitance between the heater electrodes 21 and 22 and occupant 120 become less influential. Therefore, the occupant 120 can be detected without significant influence of the capacitance due to the heater electrodes 21 and 22. Then, the occupant 120 can be detected with accuracy. Here, it is preferable that the distance between the heater electrodes 21 and 22 and sensor electrode 27 is 10 mm or larger. With the distance between the heater electrodes 21 and 22 and sensor electrode 27 being approximately 10 mm or larger, the occupant 120 can be detected with higher accuracy.

Here, when the heater electrodes 21 and 22 are connected to the heater unit 32, the heater electrodes 21 and 22 may be grounded to the vehicle 100 via the heater unit 32. In such a case, the capacitance between the heater electrodes 21 and 22 and the vehicle 100 or sensor electrode 27 is more influential. However, the occupant 120 seated on the seat 101 can be detected in consideration of the capacitance between the heater electrodes 21 and 22 and occupant 120 and the capacitance between the heater electrodes 21 and 22 and sensor electrode 27.

Furthermore, in this embodiment, the detection unit 33 monitors the potential of the heater electrode 22 to determine whether the heater electrodes 21 and 22 are disconnected from the heater unit 32. This is not restrictive. The detection unit 33 can monitor the changeover switch SW1 to determine whether the heater electrodes 21 and 22 are disconnected from the heater unit 32.

Furthermore, in this embodiment, the detection unit 33 monitors the potential of the heater electrode 21 to determine whether the heater electrodes 21 and 22 are disconnected from the heater unit 32. This is not restrictive. The detection unit 33 can drive the changeover switch SW1 to disconnect the heater electrodes 21 and 22 from the heater unit 32 before detecting the occupant 120.

Furthermore, in this embodiment, the threshold for determining whether the occupant 20 is seated on the seat 101 is corrected based on the value of the in-phase component I output from the quadrature demodulator 33b. Therefore, the occupant 120 can be detected with accuracy.

<Embodiment 2>

The heating system according to Embodiment 2 of the present invention will be described hereafter. A heating system 10A according to this embodiment is different from Embodiment 1 in that an AC voltage is applied both to the sensor electrode 27 and to the heater electrodes 21 and 22 in detecting the occupant 120.

Figure 11:
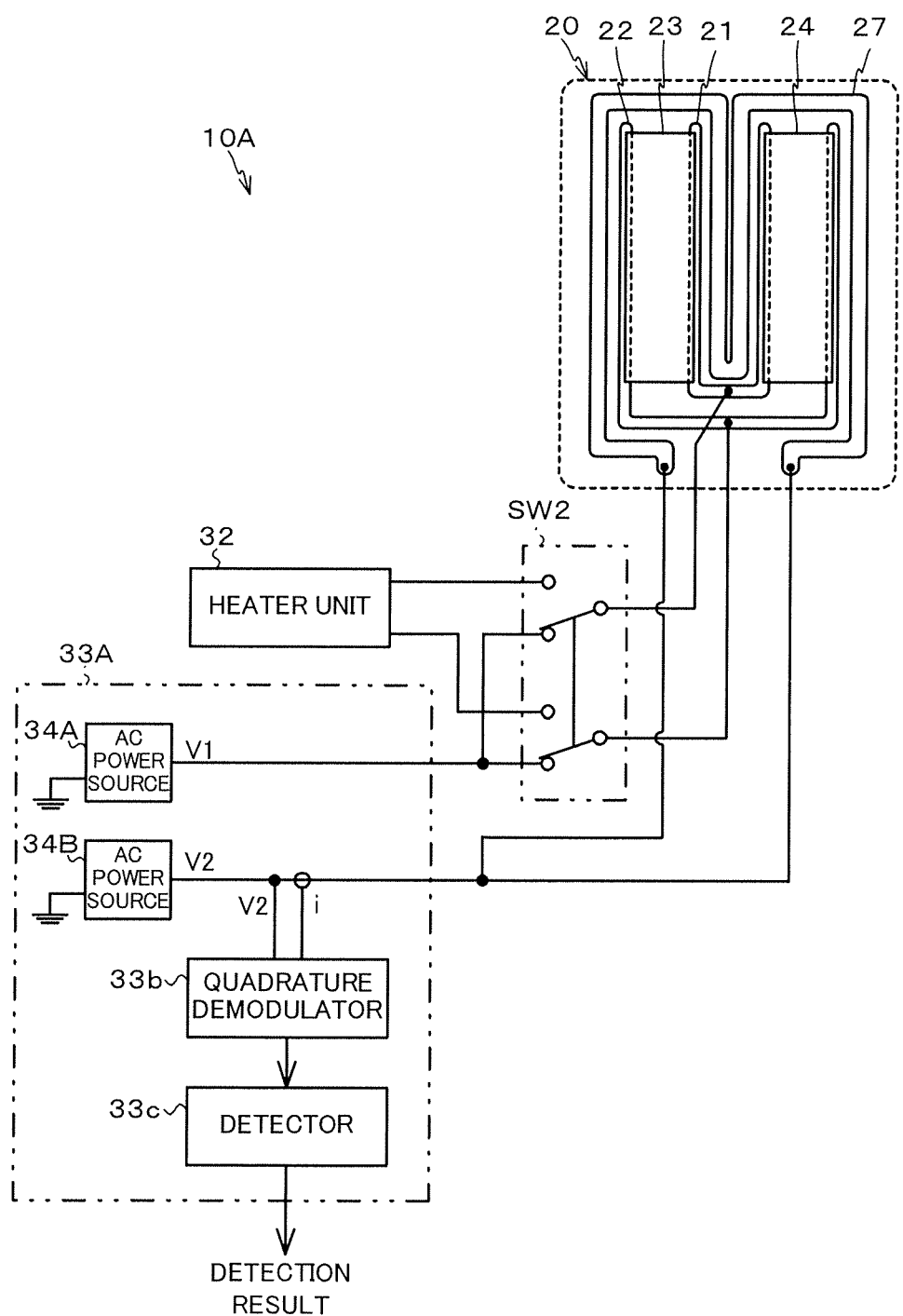
FIG. 11 is a block diagram of the heating system according to Embodiment 2.

FIG. 11 is a block diagram of the heating system 10A according to this embodiment. As shown in FIG. 11, the heating system 10A has a changeover switch SW2 and a detection unit 33A.

The changeover switch SW2 connects each of the heater electrodes 21 and 22 of the seat heater 20 to the heater unit 32 and to the detection unit 33A alternately.

The detection unit 33A constituting the heating system 10A has AC power sources 34A and 34B, an quadrature demodulator 33b, and a detector 33c.

The AC power source 34A applies an AC voltage V1 of an amplitude v to the heater electrodes 21 and 22 when the changeover switch SW2 connects the heater electrodes 21 and 22 of the seat heater 20 to the detection unit 33A.

The AC power source 34B applies to both ends of the sensor electrode 27 an AC voltage V2 equal in amplitude and cycle length to and different in phase by 180 degrees from the AC voltage V1 applied by the AC power source 34A.

Figure 12:
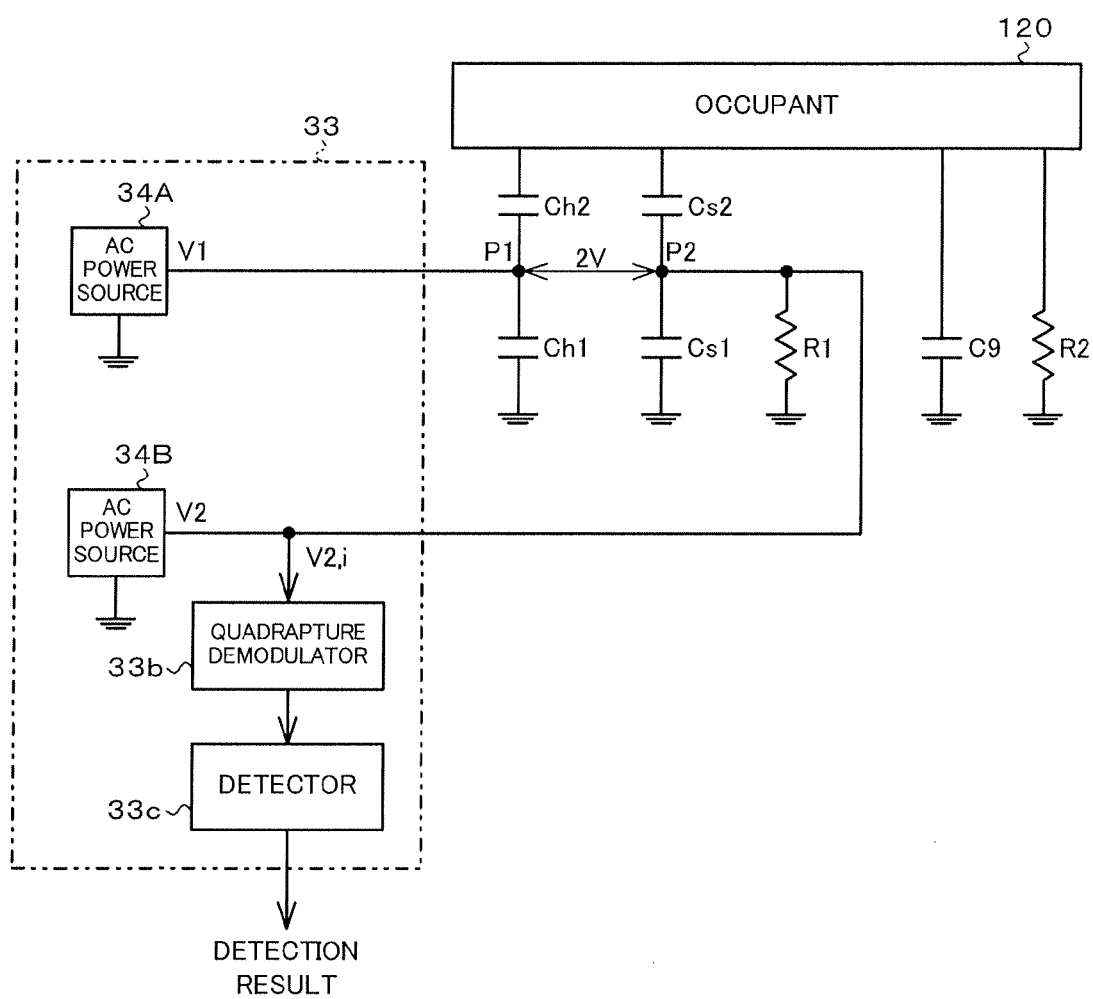
FIG. 12 is a diagram showing an equivalent circuit to the electric circuit in FIG. 11.

For example, FIG. 12 is an equivalent circuit to the circuit formed when the changeover switch SW2 connects the heater electrodes 21 and 22 to the detection unit 33A. As shown in FIG. 12, the equivalent circuit according to this embodiment comprises a capacitor Cs1 presenting the capacitance between the sensor electrode 27 and vehicle 100, a capacitor Cs2 presenting the capacitance between the sensor electrode 27 and occupant 120, a resistor R1 equivalent to the resistance between the sensor electrode 27 and vehicle 100, a capacitor Ch1 presenting the capacitance between the heater electrodes 21 and 22 and vehicle 100, a capacitor Ch2 presenting the capacitance between the heater electrodes 21 and 22 and occupant 120, a capacitor C9 presenting the capacitance between the occupant 120 and vehicle 100, and a resistor R2 equivalent to the resistance between the occupant 120 and vehicle 100.

In this embodiment, the AC voltages applied by the AC power sources 34A and 34B have a phase difference of 180 degrees. Therefore, the potential difference between points P1 and P2 in FIG. 12 is up to 2v. Then, the value of the current i supplied to the sensor electrode 27 from the AC power source 34B via the capacitors Ch2 and Cs2 is increased compared with when the potential between the points P1 and P2 is equal. Then, the values of the in-phase component I and quadrature component Q of the current i output from the quadrature demodulator 33b at the AC voltage V2 become relatively high. Consequently, the detector 33c has sensitivity to the area of a conductive substance near the seating surface and is capable of sensitive detection of the occupant 120 seated on the seat 101.

Furthermore, in this embodiment, the AC voltages V1 and V2 applied by the AC power sources 34A and 34B have a phase difference of 180 degrees from each other. This is not restrictive. Even if the AC voltages V1 and V2 applied by the AC power sources 34A and 34B have an equal phase and amplitude, the detection unit 33 is capable of detecting the occupant 120 seated on the seat 101. In such a case, the heater electrodes 21 and 22 function as the sensor electrode. In other words, in this embodiment, the capacitor Ch2 between the heater electrodes 21 and 22 and occupant 120 contributes to detection of the occupant 120 and the sensor electrode 27 and heater electrodes 21 and 22 can be treated as one electrode.

For example, when the sensor electrode 27 and heater electrodes 21 and 22 are driven in phase, influence of the heater electrodes 21 and 22 can be neglected. Then, the presence of the occupant 120 in the seat 101 can be detected based on the change in capacitance $(Cs2 \cdot C9)/(Cs2+C9)$. On the other hand, the presence of the occupant 120 in the seat 101 can be detected based on the change in capacitance $((Ch2+Cs2) \cdot C9)/(Ch2+Cs2+C9)$ by driving the sensor electrode 27 and heater electrodes 21 and 22 in phase and detecting the quadrature component Q of the current to the heater electrodes 21 and 22. Therefore, the detection unit 33 can detect the occupant 120 seated on the seat 101 with accuracy.

When the AC voltages V1 and V2 applied by the AC power sources 34A and 34B have an equal phase and amplitude, the capacitance of the capacitor C9 presenting the capacitance between the occupant 120 and vehicle 100 is smaller than the total capacitance of the capacitors Cs2 and Ch2. Therefore, detection of the occupant 120 is significantly influenced by the capacitance of the capacitor C9. Then, sensitivity to the spatial extension of a conductive substance on the seating surface 101*a* of the seat 101 is improved.

As described above, in this embodiment, changing the phases of the AC voltages V1 and V2 applied by the AC power sources 34A and 34B enables use of the heater electrodes 21 and 22 for detecting the occupant 120 and adjustment of the sensitivity of detection of the occupant 120 by the sensor electrode 27.

Figure 13:
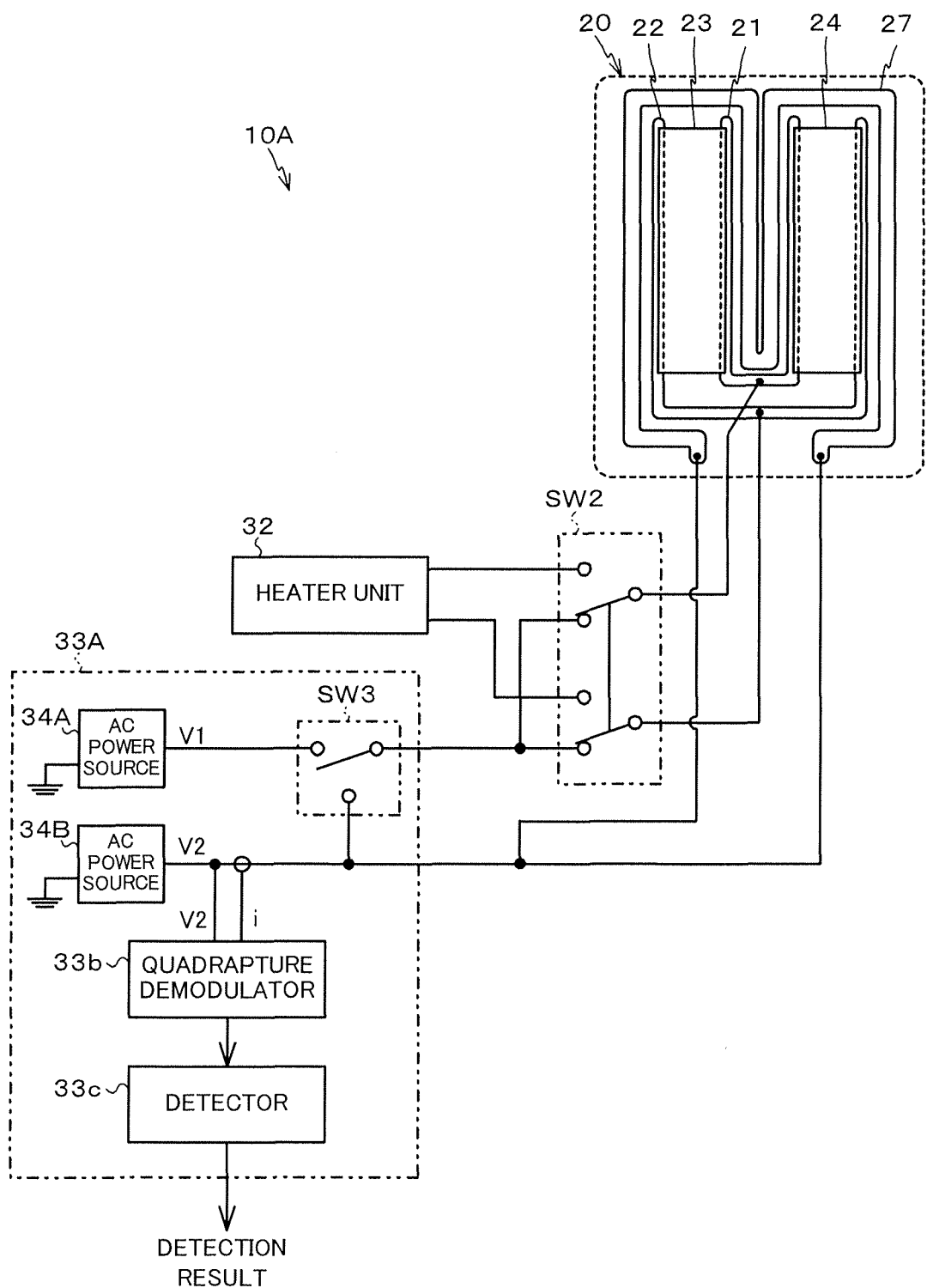
FIG. 13 is a diagram showing a modified embodiment of the heating system.

Embodiments of the present invention are described above. However, the present invention is not restricted to the above embodiments. For example, as seen from FIG. 11, the heater electrodes 21 and 22 are connected to the AC power source 34A in Embodiment 2. This is not restrictive. The heater electrodes 21 and 22 can be connected to both AC power sources 34A and 34B intermittently using a changeover switch SW3 as shown in FIG. 13. In such a case, the occupant 120 seated on the seat 101 can be detected with higher accuracy by comparing the in-phase component I and quadrature component Q between when a voltage equal in phase to that to the sensor electrode 27 is applied to the heater electrodes 21 and 22 and when a voltage different in phase from that to the sensor electrode 27 is applied to the heater electrodes.

Furthermore, as seen from FIG. 13, the occupant 120 seated on the seat 101 can be detected with higher accuracy by further comparing the in-phase component I and quadrature component Q between when the heater electrodes 21 and 22 are connected to the heater unit 32 and grounded and when the heater electrodes 21 and 22 are released (not grounded) by means of the changeover switch SW2.

Furthermore, in the above embodiment, the voltage applied by the AC power source 34A and the voltage applied by the AC power source 34B have a phase difference of 180 degrees. Their phase difference is not necessarily 180 degrees.

Furthermore, in the above embodiment, information regarding the result of determination by the detection unit 33 is output to an external device. This is not restrictive. Information regarding the result of determination by the detection unit 33 can be output to the heater unit 32. In this way, the heater unit 32 can stop energizing the heater electrodes 21 and 22, for example, when the occupant 120 is not seated on the seat 101. Consequently, wasteful power consumption can be reduced.

In this embodiment, the AC power source 34A is connected to the heater electrodes 21 and 22 and the AC power source 34B is connected to the sensor electrode 27. This is not restrictive. The AC power source 34A may be connected to the sensor electrode 27 and the AC power source 34B is connected to the heater electrodes 21 and 22. Furthermore, for applying voltages having an equal phase to the heater electrodes 21 and 22 and sensor electrode 27, either one of the AC power sources 34A and 34B can be connected to the heater electrodes 21 and 22 and sensor electrode 27.

Furthermore, in this embodiment, only the sensor electrode 27, heater electrodes 21 and 22, and heating elements 23 and 24 are formed on the top surface of the insulation sheet 25. This is not restrictive. The signal lines for the heater unit 32 and detection unit 33 can be formed by the conductor pattern of the insulation sheet 25. For example, when the heater unit 32 and detection unit 33 are housed in separate enclosures, these units communicate with each other via the conductor pattern formed on the insulation sheet 25. Then, the wiring between the heater unit 32 and detection unit 33 can be simplified.

Furthermore, the heater unit 32 may acquire information regarding the in-phase component I and, if the in-phase component I exceeds a threshold, determine that the seat 101 is moist and continue to energize the heater electrodes 21 and 22. In this way, the seat 101 will dry faster and the accuracy of detection of the occupant 120 seated on the seat 101 will be improved.

Figure 14:
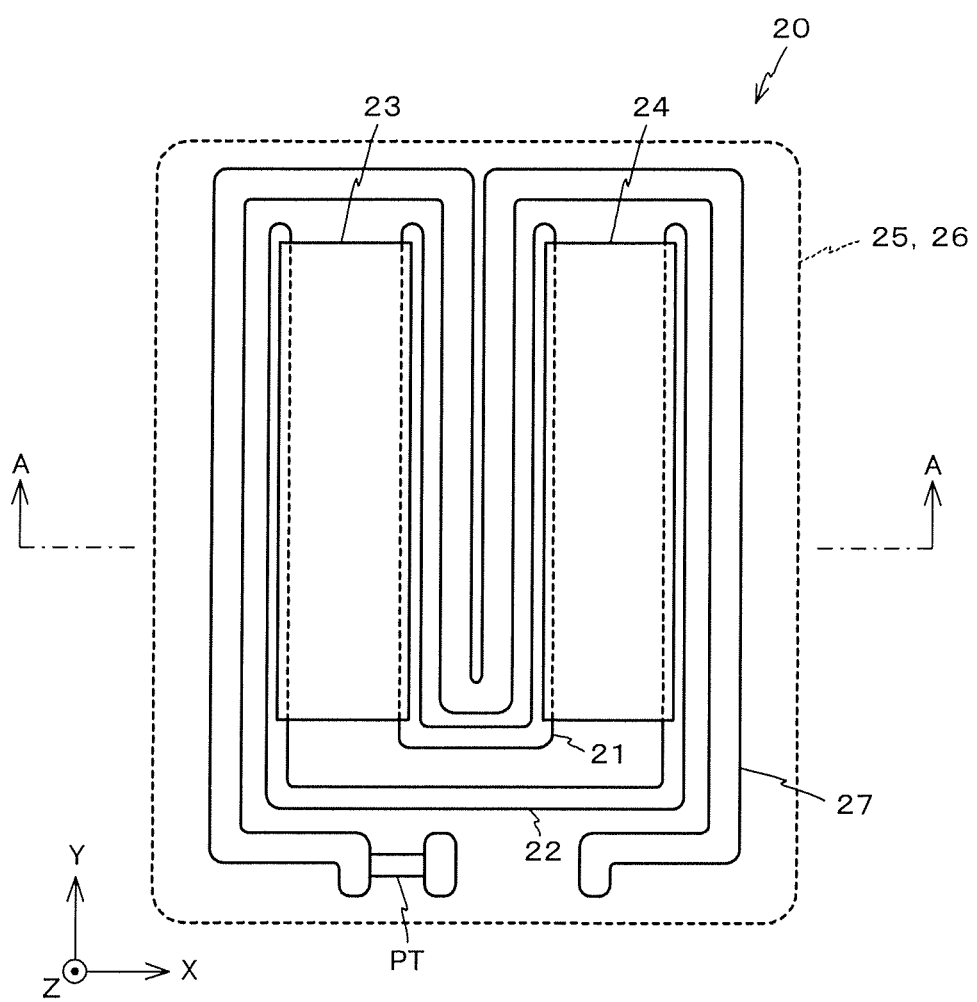
FIG. 14 is a diagram showing a modified embodiment of the seat heater.

Furthermore, as shown in FIG. 14, a temperature measuring resistor PT for detecting the temperature of the seat 101 can be formed on the top surface of the insulation sheet 25. In this way, the detection unit 33 can detect the temperature of the seat 101 from the resistance value of the temperature measuring resistor PT, and correct the threshold for determining whether the occupant 120 is seated on the seat 101 in consideration of the detected temperature.

Furthermore, the temperature of the seat 101 may be detected from the resistance values of the heating elements 23 and 24 that are measured via the heater electrodes 21 and 22, and the threshold for determining whether the occupant 120 is seated on the seat 101 may be corrected in consideration of the detected temperature.

Furthermore, the detection unit according to the above embodiments can be constructed by hardware, or can be a computer composed of a CPU (central processing unit), main storage, auxiliary storage, and so on, or a microcomputer.

Furthermore, in the above embodiments, the seat heater 20 is installed in the seat 101 of the vehicle 100. This is not restrictive. The seat heater 20 can be installed somewhere in the vehicle 100 other than the seat 101.

Various embodiments and modifications are available to the present invention without departing from the broad sense of spirit and scope of the present invention. The above-described embodiments are given for explaining the present invention and do not confine the scope of the present invention. In other words, the scope of the present invention is set forth by the scope of claims, not by the embodiments. Various modifications made within the scope of claims and scope of significance of the invention equivalent thereto are considered to fall under the scope of the present invention.

The heater and heating system of the present invention is suitable for warming the occupant and for detecting the occupant.

The invention claimed is:

1. A heating system for warming an occupant seated on a seat of a vehicle, the heating system comprising:
a heater comprising:
a heating element for being disposed in the seat;
heater electrodes connected to the heating element; and
a sensor electrode for being disposed in the seat,
wherein the heater electrodes are supplied with electric power to the heating element,
the impedance between the sensor electrode and vehicle varies depending on the presence of the occupant in the seat, and
the heater electrodes and sensor electrode are placed in the same plane;
the heating system further comprising:
a supply unit that is connected to the heater electrodes and supplies electric power to the heating element;
a measurement unit that measures the impedance between the sensor electrode and vehicle; and
a detection unit for detecting the occupant seated on the seat based on the impedance measured by the measurement unit.

2. The heating system according to claim 1, comprising:
a switching unit that periodically connects the supply unit and heater electrodes,
wherein the measurement unit detects the occupant from the result of comparison of the impedance between when the supply unit and heater electrodes are connected and when the supply unit and heater electrodes are disconnected.

3. The heating system according to claim 2, wherein:
the heater electrodes are connected to the supply unit and to a power source applying a voltage to the heater electrodes alternately, and
the impedance is measured when a voltage equal in phase to the voltage applied to the sensor electrode is applied to the heater electrodes.

4. The heating system according to claim 2, wherein:
the heater electrodes are connected to the supply unit and to a power source applying a voltage to the heater electrodes alternately, and
the impedance is measured when a voltage different in phase from the voltage applied to the sensor electrode is applied to the heater electrodes.

5. The heating system according to claim 1, wherein:
the measurement unit measures the capacitance between the sensor electrode and vehicle as an impedance correlation value from an AC voltage applied between the sensor electrode and vehicle and a current or voltage input to the sensor electrode in response to change in the impedance.

6. The heating system according to claim 5, wherein:
the measurement unit measures a quadrature component of the current at the AC voltage as the capacitance as an impedance correlation value.

7. The heating system according to claim 6, wherein:
the measurement unit measures an in-phase component of the current at the AC voltage, and
the detection unit detects the occupant seated on the seat from a result of comparison between a threshold defined based on a relationship between the in-phase component and quadrature component and the capacitance.

8. The heating system according to claim 7, comprising:
a temperature detection sensor detecting the temperature of the seat near the heating element,
wherein the detection unit detects the occupant from the temperature of the seat detected by the temperature detection sensor and the result of comparison between the threshold and capacitance.

9. The heating system according to claim 1, comprising:
a switching unit that periodically connects the supply unit and heater electrodes,
wherein the measurement unit measures the impedance when the supply unit and heater electrodes are disconnected.

10. The heating system according to claim 9, wherein the switching unit connects the heater electrodes to the supply unit and to a power source applying a voltage to the heater electrodes alternately.

11. The heating system according to claim 10, wherein the power source applies a voltage different in phase from the voltage applied to the sensor electrode.

12. The heating system according to claim 10, wherein the power source applies a voltage equal in phase to the voltage applied to the sensor electrode.

13. A heating system for warming an occupant seated on a seat of a vehicle, the heating system comprising:
a heater comprising:
a heating element for being disposed in the seat;
heater electrodes connected to the heating element; and
a sensor electrode for being disposed in the seat,
wherein the heater electrodes are supplied with electric power to the heating element,
the impedance between the sensor electrode and vehicle varies depending on the presence of the occupant in the seat,
the heater electrodes and sensor electrode are placed in the same plane, and
the heater electrodes and sensor electrode are in a film shape;
the heating system further comprising:
a supply unit that is connected to the heater electrodes and supplies electric power to the heating element;
a measurement unit that measures the impedance between the sensor electrode and vehicle; and
a detection unit for detecting the occupant seated on the seat based on the impedance measured by the measurement unit.

14. The heating system according to claim 13, comprising:
a switching unit that periodically connects the supply unit and heater electrodes,
wherein the measurement unit measures the impedance when the supply unit and heater electrodes are disconnected.

* * * * *